United States Patent
Wu et al.

(10) Patent No.: US 7,597,535 B2
(45) Date of Patent: Oct. 6, 2009

(54) FAN MODULE AND ITS FAN CASING

(75) Inventors: Chun-Nan Wu, Taoyuan Hsien (TW); Kuo-Tung Hsu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 404 days.

(21) Appl. No.: 11/472,472

(22) Filed: Jun. 22, 2006

(65) Prior Publication Data

US 2007/0003419 A1   Jan. 4, 2007

(30) Foreign Application Priority Data

Jun. 30, 2005   (TW) ............................... 94122134 A (51) Int. Cl.
*F01D 5/10* (2006.01)

(52) U.S. Cl. ................. 415/119; 415/174.2; 415/213.1; 415/214.1

(58) Field of Classification Search ................. 415/119, 415/174.2, 213.1, 214.1, 220
See application file for complete search history.

(56) References Cited

U.S. PATENT DOCUMENTS

| | | | | |
|---|---|---|---|---|
| 4,807,718 A | * | 2/1989 | Lotz | 181/202 |
| 5,002,462 A | * | 3/1991 | Janisse | 416/247 R |
| 5,316,423 A | * | 5/1994 | Kin | 411/510 |
| 5,906,475 A | * | 5/1999 | Melane et al. | 415/214.1 |
| 6,215,659 B1 | * | 4/2001 | Chen | 361/695 |
| 6,616,525 B1 | * | 9/2003 | Giraldo et al. | 454/184 |
| 6,826,048 B1 | * | 11/2004 | Dean et al. | 415/213.1 |
| 7,289,321 B2 | * | 10/2007 | Patel et al. | 361/695 |

* cited by examiner

*Primary Examiner*—Igor Kershteyn
(74) *Attorney, Agent, or Firm*—Birch, Stewart, Kolasch & Birch, LLP (57) ABSTRACT

A fan module adapted to be assembled onto a system frame includes a body, a fan assembly, and at least two connecting elements. The body has an accommodating space. The fan assembly is disposed in the accommodating space. The connecting elements are protruded from the body, and the connecting elements are inserted to and connected with a plurality of holes of the system frame.

16 Claims, 12 Drawing Sheets

FAN MODULE AND ITS FAN CASING

BACKGROUND OF THE INVENTION

1. Field of Invention

The invention relates to a heat dissipating structure, and, in particular, to a fan module and a fan casing.

2. Related Art

Figure 1:
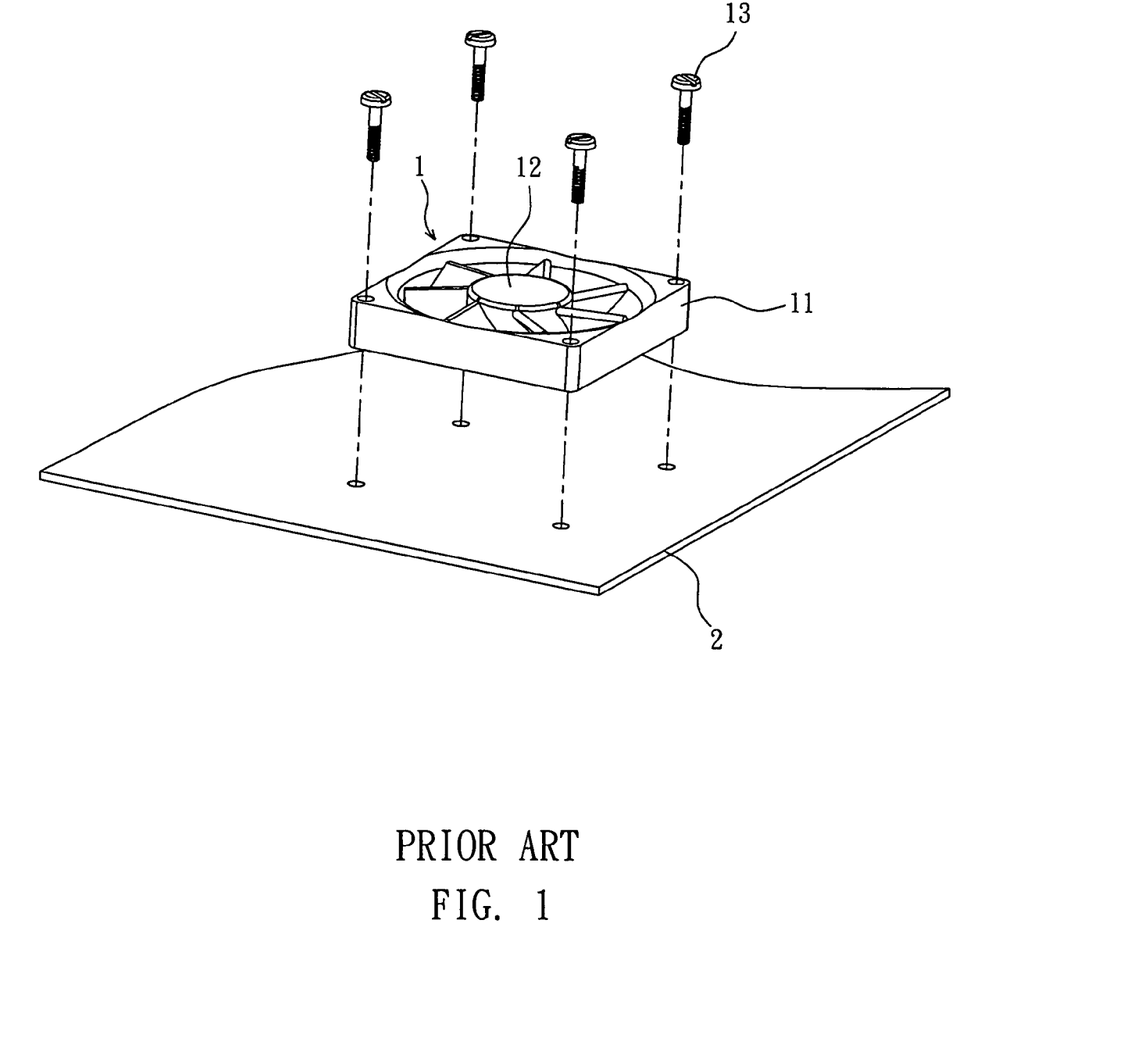
FIG. 1 is a schematic illustration showing a conventional fan module.

As shown in FIG. 1, a conventional fan 1 has an external frame 11 and a fan assembly 12 installed in the external frame 11. In the conventional structure, four screws 13 passing through the external frame 11 are utilized to fasten the fan 1 to a system frame 2. Thus, the fan 1 can be assembled on the system frame 2.

Figure 2:
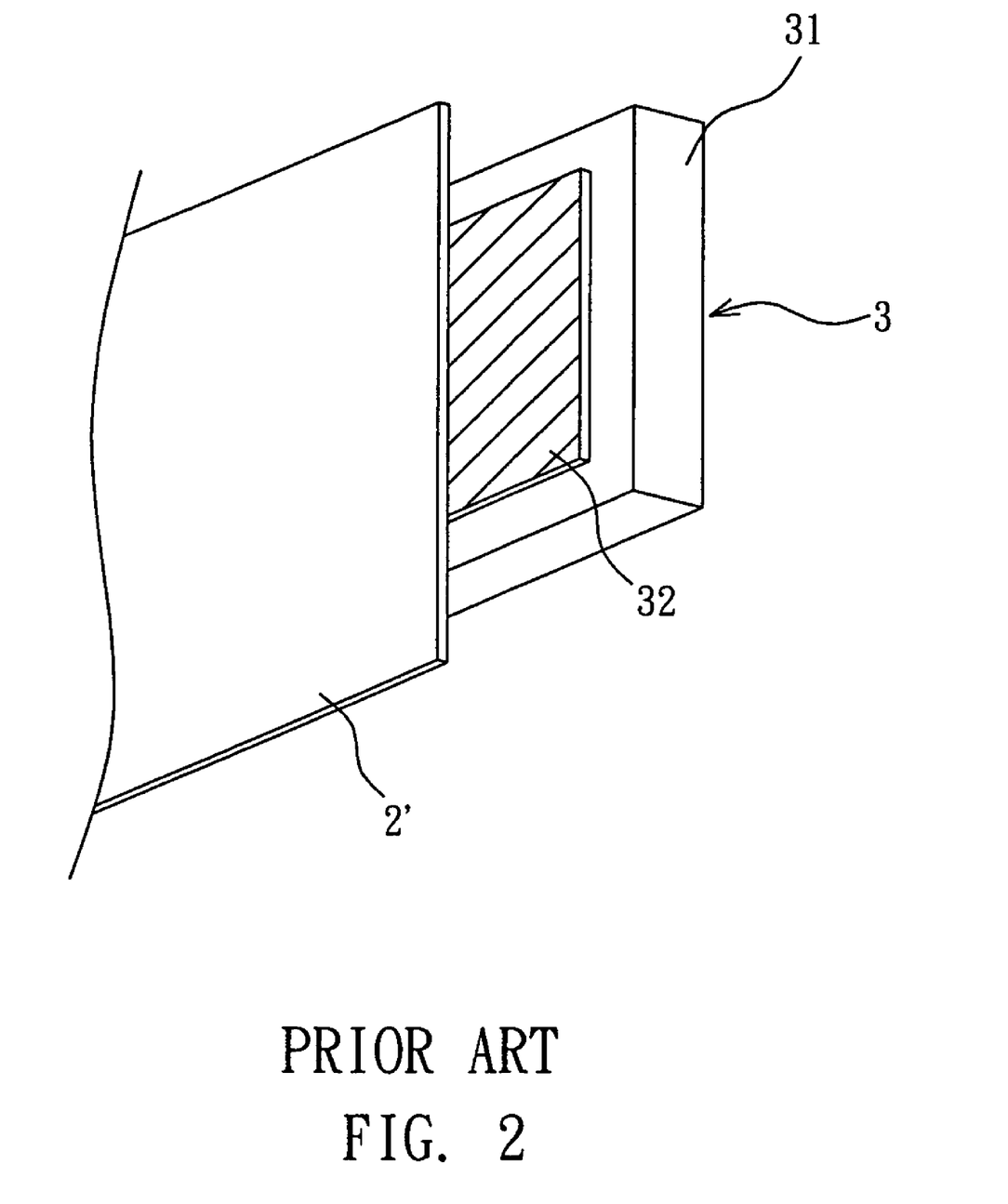
FIG. 2 is a schematic illustration showing another conventional fan module.

In addition to the screws, an adhesive agent 32 may be applied to a backside of an external frame 31 of a conventional fan 3, as shown in FIG. 2. Thus, the external frame 31 may be assembled on a system frame 2' by adhering.

However, the method of screwing the external frame to the system frame is laborious and time-consuming. Furthermore, the screws will be loosed after a period of time such that the fan cannot be firmly assembled on the system frame, or even the fan may be damaged due to the loosed screws. In addition, to adhere the external frame to the system frame may consume the cost of the adhesive agent. Besides, if the fan is adhered to the system frame, the fan cannot be easily disassembled from the system frame for replacement, which is very inconvenient.

SUMMARY OF THE INVENTION

In view of the foregoing, the invention is to provide a fan module and its fan casing capable of reducing the manufacturing cost and the assembling time of the fan casing.

To achieve the above, a fan module of the invention is adapted to be assembled on a system frame having a plurality of holes and includes a body, a fan assembly and at least two connecting elements. The body has an accommodating space, and the fan assembly is disposed in the accommodating space. Each connecting element protrudes from the body and the connecting elements are inserted into and connected with the holes, respectively.

To achieve the above, a fan casing of the invention is adapted to be assembled on a system frame and includes a body and at least two supporting elements. In the invention, the supporting elements are disposed on an outer periphery of the body and in contact with the system frame respectively.

To achieve the above, a fan casing of the invention is adapted to be assembled on a system frame having a plurality of holes and includes a body and at least two connecting elements. In the invention, the connecting elements protrude from the body, and each connecting element is inserted into and connected with the hole.

As mentioned above, the fan module and its fan casing of the invention have two connecting elements or two supporting elements. Compared to the prior art, the fan module may be firmly mounted on the system frame after each connecting element is inserted into and connected with the hole of the system frame. Thus, the installation is time-saving and convenient, and the cost may be reduced. In this structure, each supporting element may be still in contact with the system frame to provide a sufficient supporting force even if the material for constructing the body is reduced. Thus, the invention indeed has a better product utility.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

As shown in FIGS. 3, 4, 5 and 19, a fan module 5 according to a first embodiment of the invention is assembled on a system flame 4 having four holes 41. The fan module 5 includes a body 51, a fan assembly 52 and four connecting elements 53.

In this embodiment, each hole 41 of the system frame 4 has a large-radius portion 411, a small-radius portion 412, and a neck portion 413 between the large-radius portion 411 and the small-radius portion 412. A maximum inner diameter of the large-radius portion 411 is "a". An inner diameter of the neck portion 413 is "b". A maximum inner diameter of the small-radius portion 412 is "c". The condition of $a > c \geqq b$ exists.

Figure 3:
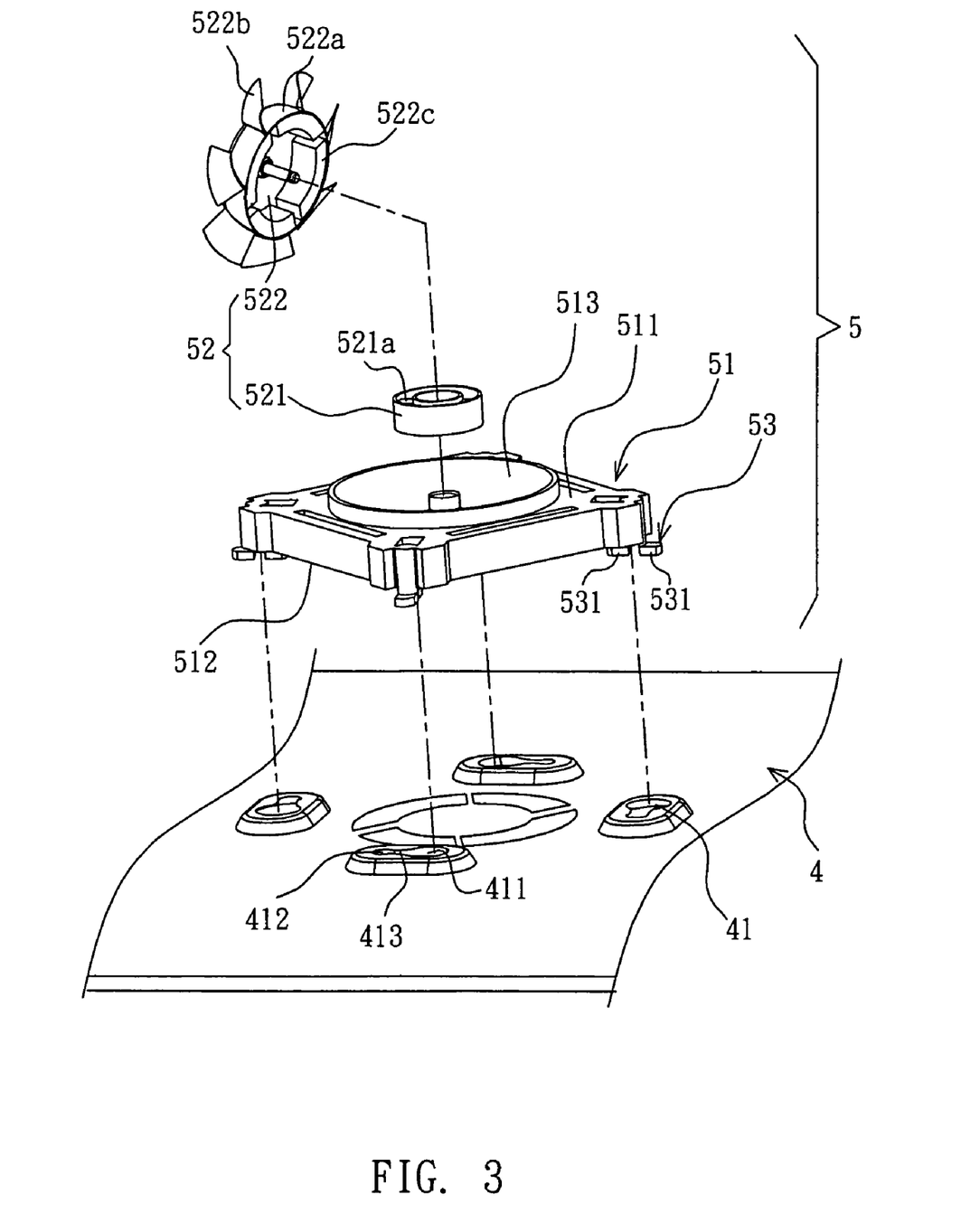
FIG. 3 is an exploded view showing a fan module according to a first embodiment of the invention.

As shown in FIG. 3, the body 51, which may have an approximately polygonal shape such as a rectangular shape, a circular shape or an elliptic shape, has a top surface 511 and a bottom surface 512. In addition, the top surface 511 of the body 51 is formed with a concave accommodating space 513. In this embodiment, the accommodating space 513 is located at a side of the body 51 opposite to the system frame 4. Of course, the accommodating space 513 may also be located at a side of the body 51 facing the system frame 4.

The fan assembly 52 is disposed in the accommodating space 513. The fan assembly 52 has a stator structure 521 and a rotor structure 522 coupled to the stator structure 521. The stator structure 521 has a plurality of magnetic poles 521a. The rotor structure 522 has a hub 522a, a plurality of impellers 522b mounted around the hub 522a, and a permanent magnet 522c disposed in the hub 522a. The rotor structure 522 rotates relative to the stator structure 521, so that the impellers 522b can produce the air flow. Herein, the details of the fan assembly 52 will be omitted because they are not the inventive subjects of this invention.

Each connecting element 53 protrudes from the body 51 and may be inserted into and connected with each hole 41. More specifically, the connecting element 53 protrudes from an outer periphery of the body 51 in an axial direction. In this embodiment, a distal end of each connecting element 53 is formed with a hook portion 531. In addition, the connecting element 53 and the body 51 are integrally formed as a single piece. The connecting element 53 has a maximum inner diameter d and a minimum inner diameter d' before being compressed, and a maximum inner diameter e and a minimum inner diameter e' after being compressed.

Figure 4:
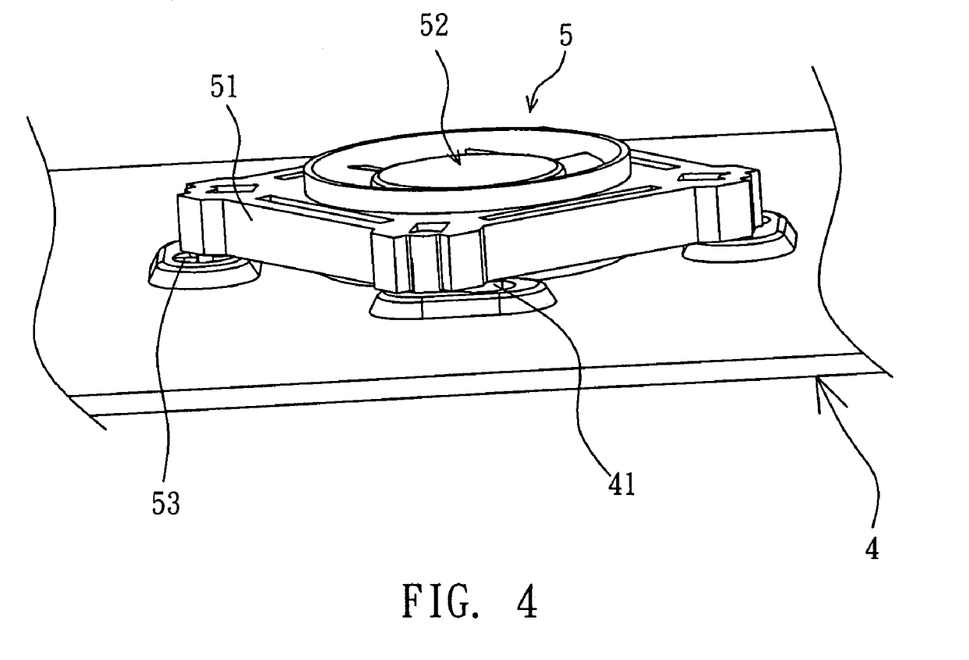
FIG. 4 is a pictorial view showing the fan module according to the first embodiment of the invention.
Figure 5:
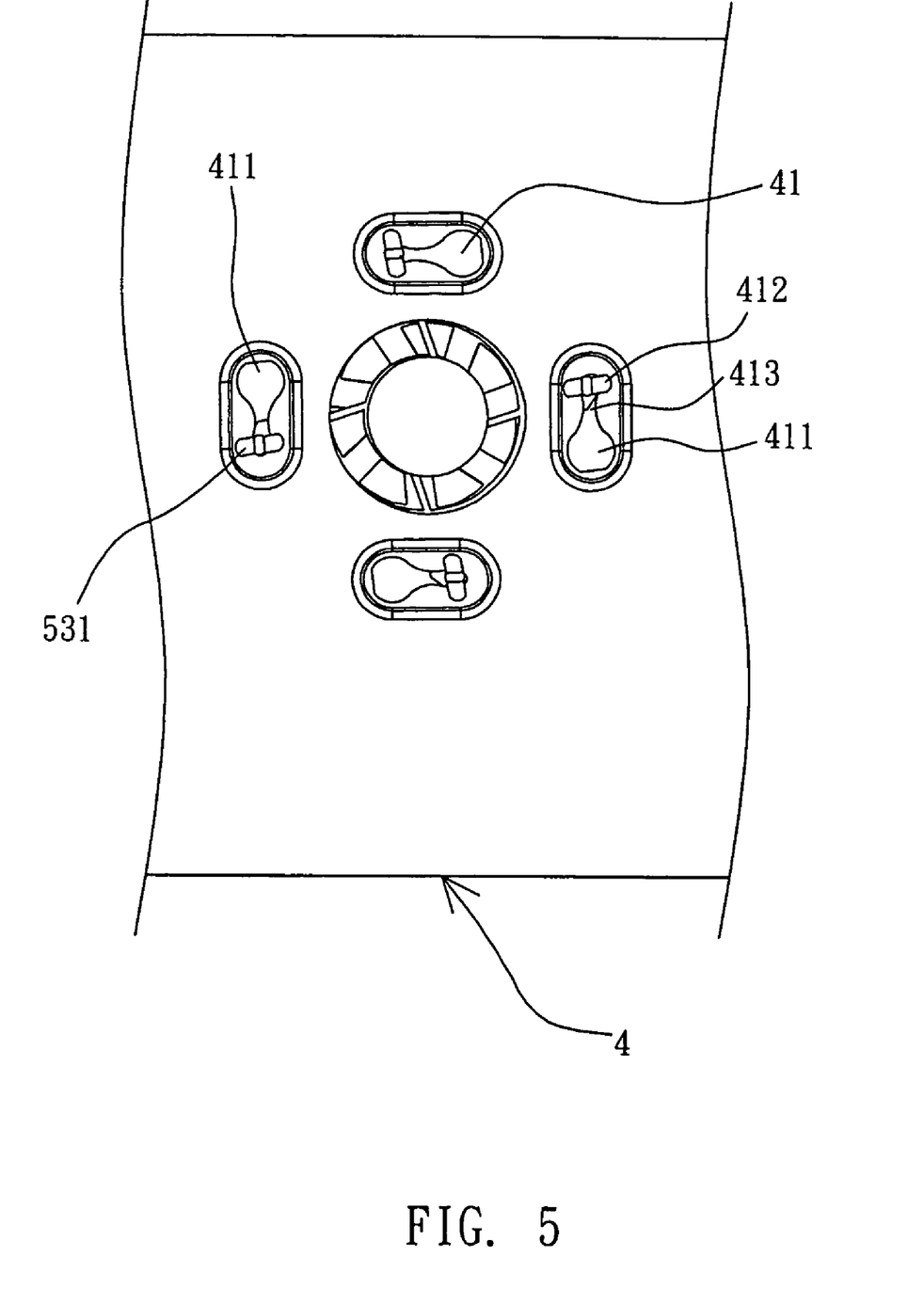
FIG. 5 is a bottom view showing the fan module according to the first embodiment of the invention.

As shown in FIGS. 4 and 5, each connecting element 53 passes through each hole 41. In detailed, the connecting element 53 goes through the large-radius portion 411 first and then moved to the small-radius portion 412 via the neck portion 413. Thus, the hook portion 531 of each connecting element 53 engages with the hole edge of the small-radius portion 412. Because the inner diameter b of the neck portion 413 is slightly smaller than the inner diameter c of the small-radius portion 412, the connecting element 53 cannot escape from the small-radius portion 412. Therefore, the fan module 5 can be assembled on the system frame 4 firmly. The maximum inner diameter a of the large-radius portion 411 is preferably greater than the maximum inner diameter d of the connecting element 53 before the connecting element 53 is compressed, and is more preferably greater than the maximum inner diameter e of the connecting element 53 after the connecting element 53 is compressed. The inner diameter b of the neck portion 413 and the maximum inner diameter c of the small-radius portion 412 preferably range between the minimum inner diameter e' of the connecting element 53 after the connecting element 53 is compressed and the maximum inner diameter d of connecting element 53 before the connecting element 53 is compressed, and more preferably range between the minimum inner diameter e' after the connecting element 53 is compressed and the minimum inner diameter d' before the connecting element 53 is compressed.

Figure 6:
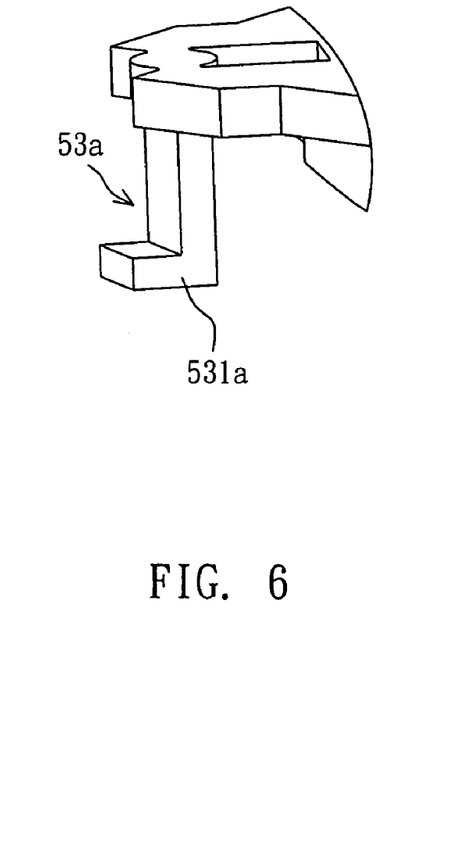
FIG. 6 is a schematic illustration showing another connecting element according to the first embodiment of the invention.
Figure 7:
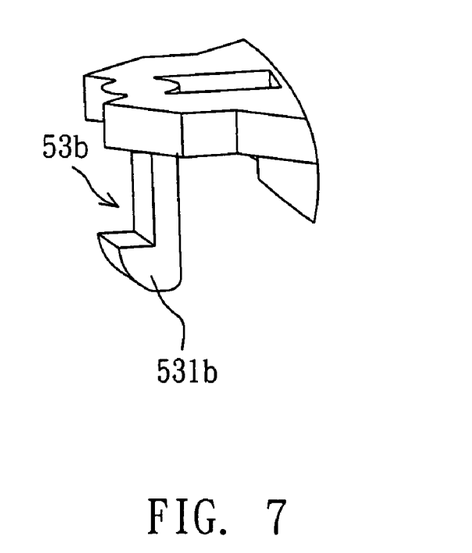
FIG. 7 is a schematic illustration showing still another connecting element according to the first embodiment of the invention.

The number and modifications of the connecting elements 53 of this invention will not be particularly restricted. As shown in FIG. 6, the connecting element 53a has an L shaped hook portion 531a formed at a distal end thereof. The connecting element 53b has an arrow-like hook portion 531b at a distal end thereof, as shown in FIG. 7. The connecting element 53 of this invention may also be composed of two separated hook portions 531. In this case, when the hook portions 531 pass through the neck portion 413, the hook portions 531 approach each other such that the inner diameter of the connecting element 53 is reduced. After the hook portions 531 pass through the neck portion 413, the original gap between the hook portions 531 will be recovered. Accordingly, the inner diameter of the connecting element 53 returns to the original dimension and the connecting element may engage with the small-radius portion 412. However, the connecting element 53 may also be composed of three or more separated hook portions 531.

Figure 8:
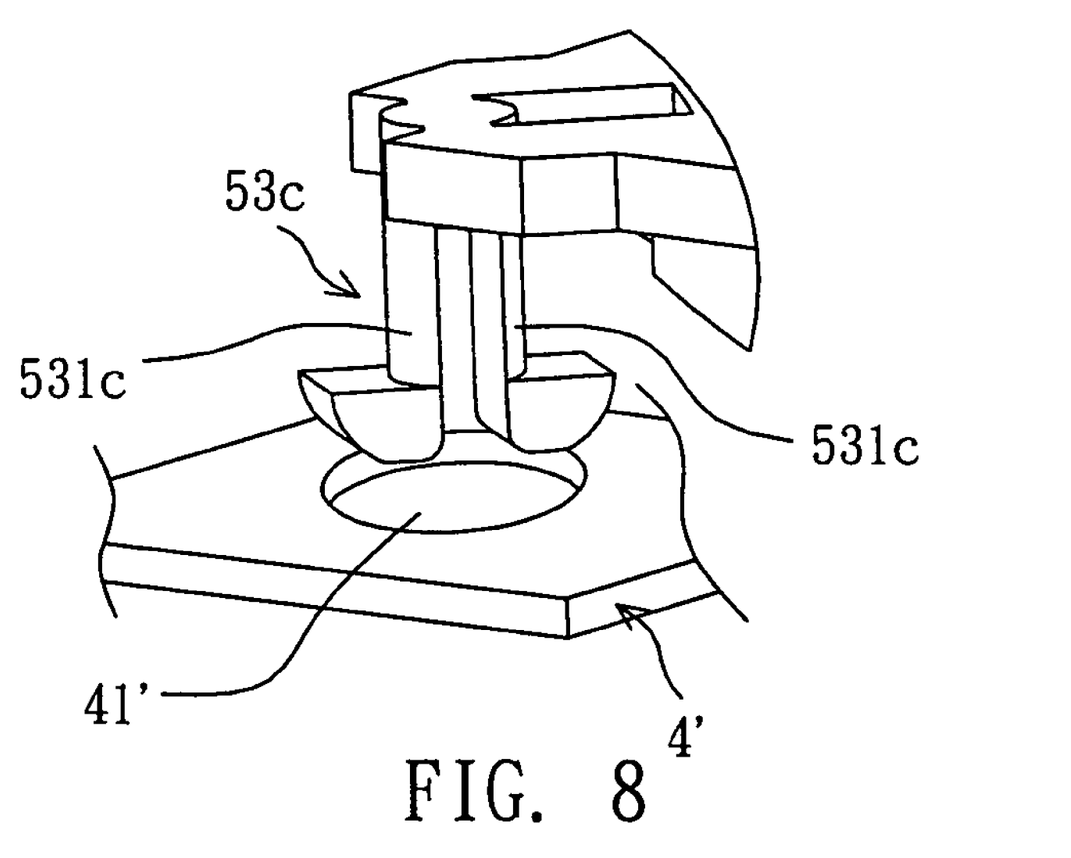
FIG. 8 is a schematic illustration showing yet still another connecting element according to the first embodiment of the invention.

In addition, the holes 41 of the system frame 4 may be modified into various shapes. For example, the hole may have a circular shape, an elliptic shape, a polygonal shape, a butterfly shape, or the likes. The connecting element 53 of the invention may also have various designs in conjunction with the hole 41 of the system frame 4. As shown in FIG. 8, the hole 41' of the system frame 4' is a circular hole. In this embodiment, the connecting element 53c has, for example, two hook portions 531c, and the connecting element 53c are resilient. Therefore, the distance between the two hook portions 531c may be shortened and the hook portions 531c may directly penetrate through the hole 41'. The hook portions 531c can then hook the edge of the hole 41'. Of course, the hole 41' and the connecting element 53 may have various variations, which should be included in the scope of the invention.

According to the above-mentioned structure, because each connecting element 53 protrudes from the body 51, the fan module 5 and the system frame 4 are combined together by directly inserting each connecting element 53 into each hole 41. Compared to the prior art, the invention is labor-saving and can shorten the time for manually disassembling the screws and reduce the cost.

Figure 9:
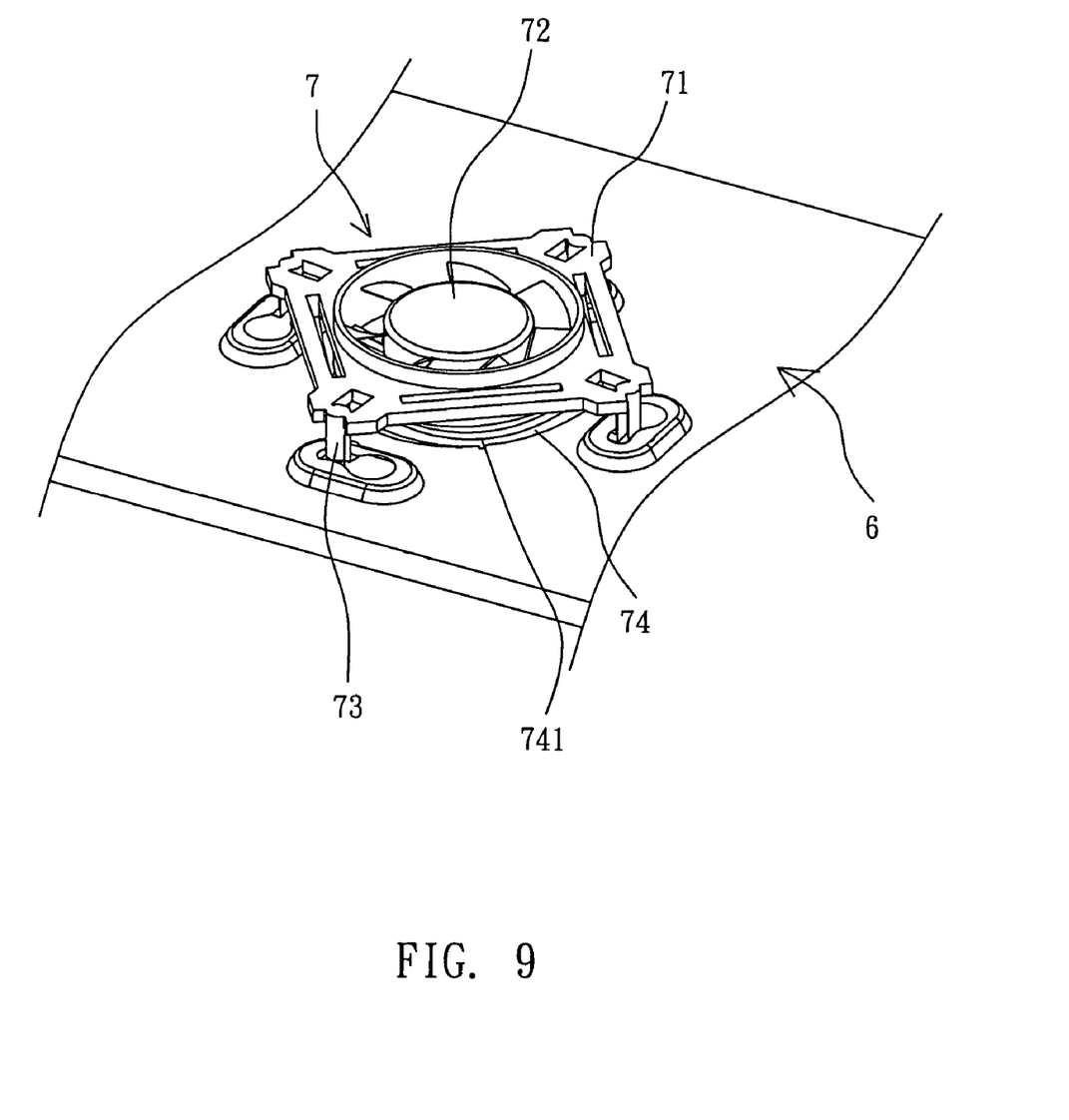
FIG. 9 is a pictorial view showing a fan module according to a second embodiment of the invention.

As shown in FIG. 9, a fan module 7 according to a second embodiment of the invention is similarly assembled on a system frame 6. The fan module 7 of this embodiment includes a body 71, a fan assembly 72 and four connecting elements 73. In addition, the fan module 7 of this embodiment further includes four supporting elements 74, each of which has at least one end connected to the body 71. The features and functions of the body 71, the fan assembly 72 and the four connecting elements 73 are the same as those of the body 51, the fan assembly 52 and the connecting element 53a of the first embodiment, and the detailed descriptions thereof will be omitted for concise purpose. In addition and of course, the connecting elements 73 may be replaced by screws for screwing the body 71 to the system frame 6.

Figure 18:
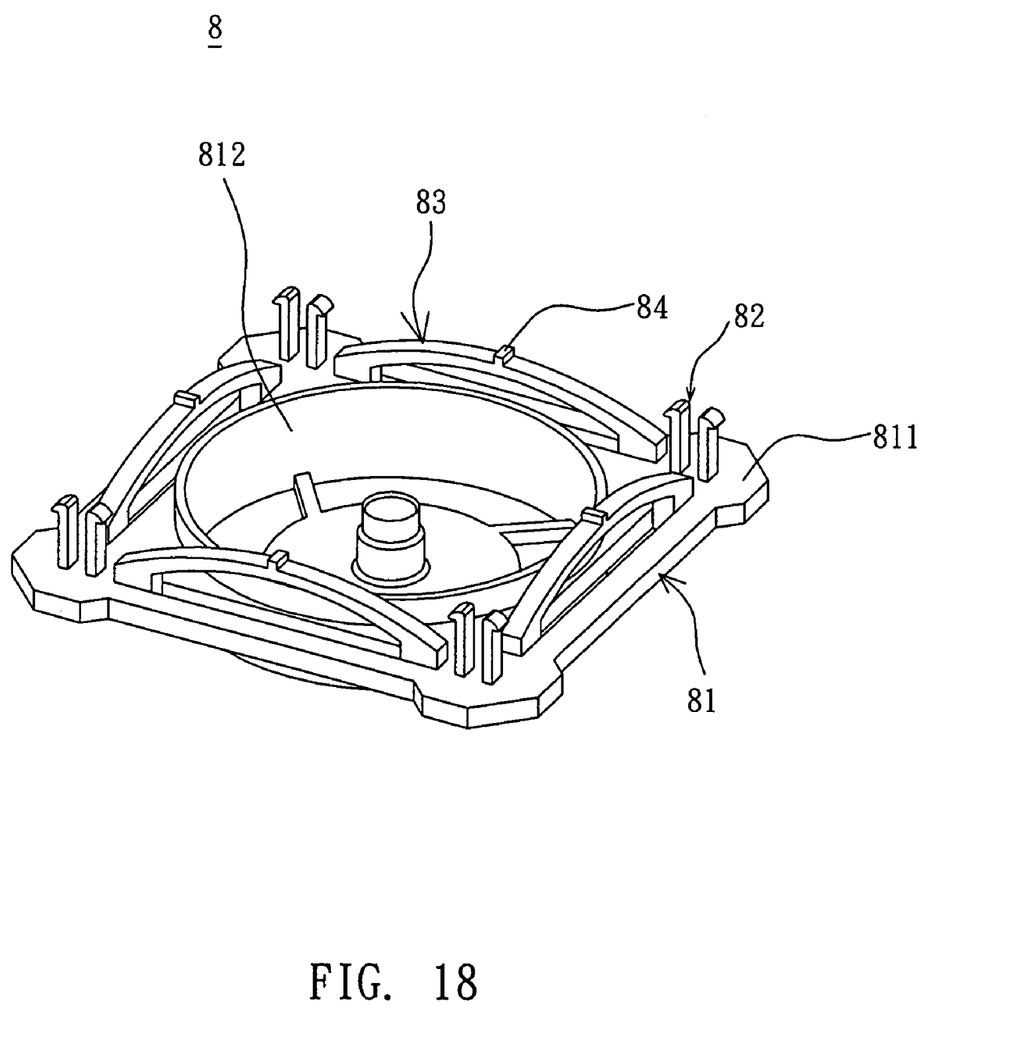
FIG. 18 is a pictorial view showing a third embodiment of the invention.
Figure 19:
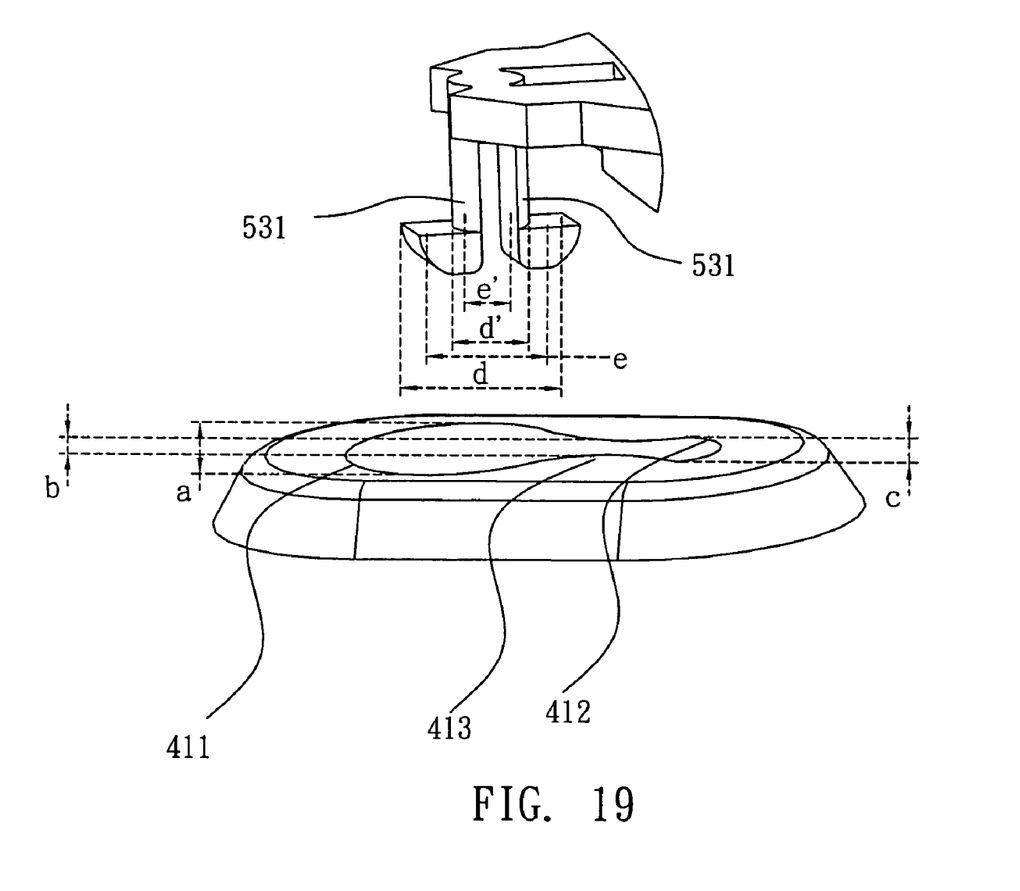
FIG. 19 is a partially pictorial view showing the first embodiment of the invention.

As shown in FIG. 9, the supporting elements 74 are disposed on four lateral sides of the body 71. In this embodiment, each supporting element 74 is an arc rib, and the supporting elements 74 and the body 71 are integrally formed as a single piece by a punching process. In addition, each supporting element 74 has a middle portion 741. When the body 71 is disposed on the system frame 6 through the connecting elements 73, the middle portion 741 of each supporting element 74 is in contact with the system frame 6. In addition, at least one protrusion, such as the protrusion 84 as shown in FIG. 18, may be formed on a contacting surface of the supporting element 74 between the supporting element 74 and the system frame 6.

Figure 10:
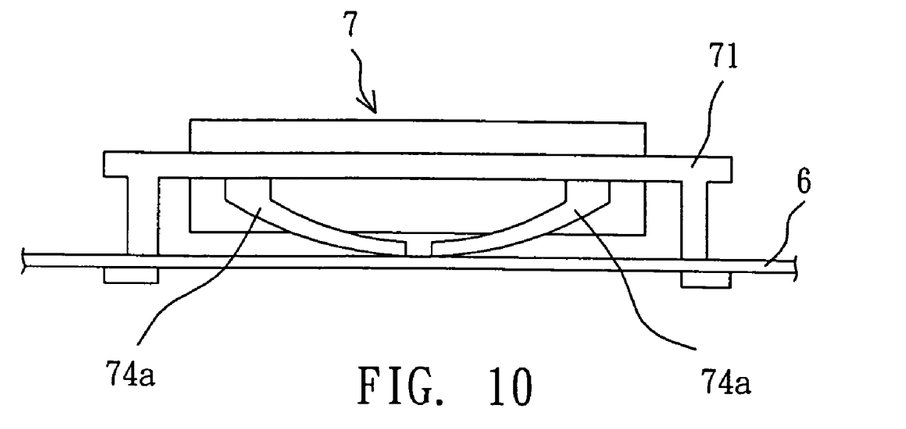
FIG. 10 is a schematic illustration showing another supporting element according to the second embodiment of the invention.

Of course, the supporting element 74 may also have other variations, and the middle portion 741 of the supporting element 74 does not need to be in contact with the system frame. As shown in FIG. 10, two ends of each lateral side of the body 71 are respectively formed with a supporting element 74a, and each supporting element 74a extends downward from the body 71 in an arc shape. Consequently, the distal end of each supporting element 74a is in contact with the system frame 6 to provide a supporting force.

Figure 11:
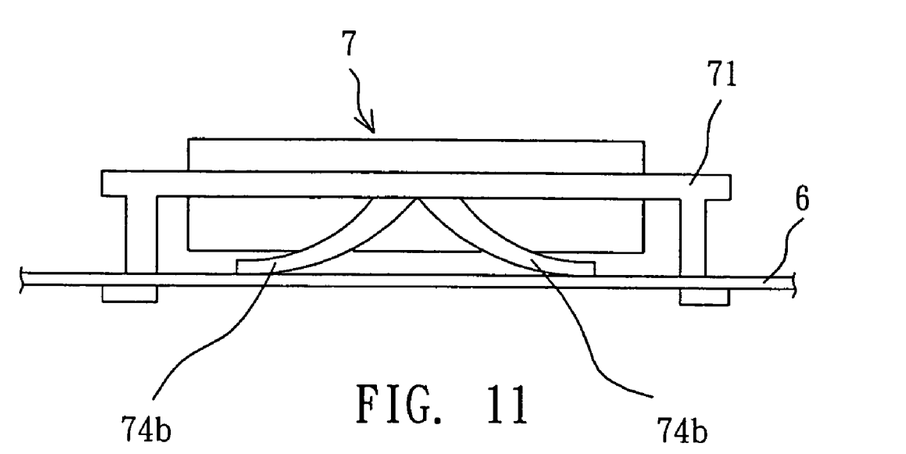
FIG. 11 is a schematic illustration showing still another supporting element according to the second embodiment of the invention.
Figure 12:
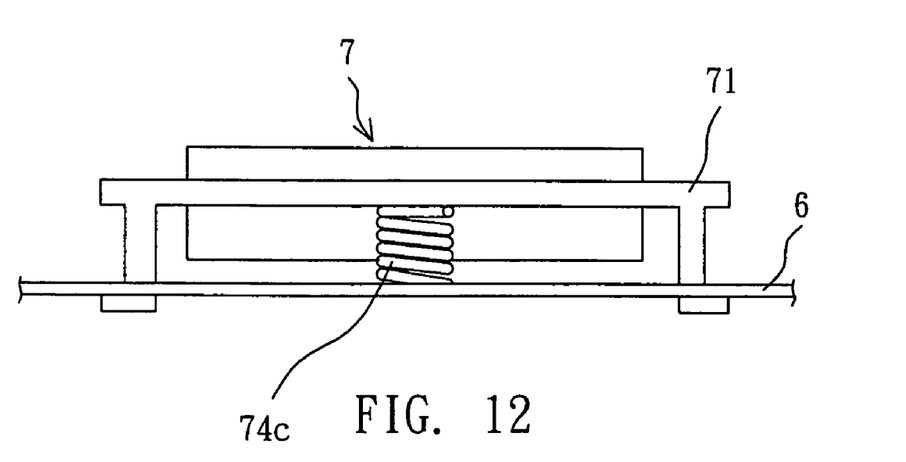
FIG. 12 is a schematic illustration showing yet still another supporting element according to the second embodiment of the invention.

As shown in FIG. 11, the middle of each lateral side of the body 71 extends downward to form two supporting elements 74b. Similarly, the distal end of each supporting element 74b is in contact with the system frame 6. Furthermore, as shown in FIG. 12, each supporting element 74c has a helical shape. For example, the supporting element 74c can be a spring, an elastomer or a helical structure. When the body 7 is assembled on the system frame 6, the distal end of each supporting element 74c rests against the system frame 6.

Figure 13:
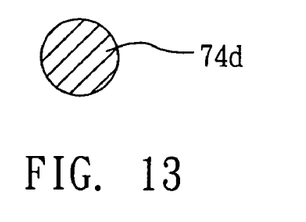
FIG. 13 is a cross-sectional view showing the supporting element according to the second embodiment of the invention.
Figure 14:
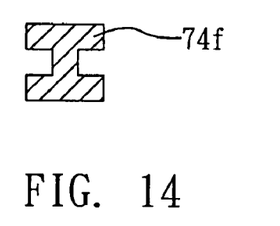
FIG. 14 is a cross-sectional view showing the supporting element according to the second embodiment of the invention.
Figure 15:
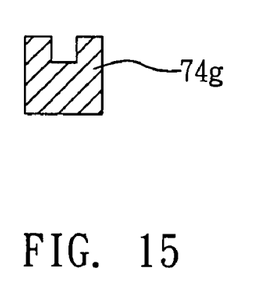
FIG. 15 is another cross-sectional view showing the supporting element according to the second embodiment of the invention.
Figure 16:
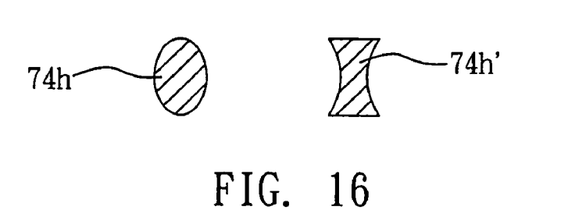
FIG. 16 is still another cross-sectional view showing the supporting element according to the second embodiment of the invention.
Figure 17:
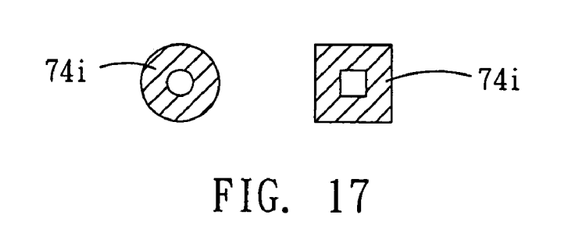
FIG. 17 is yet still another cross-sectional view showing the supporting element according to the second embodiment of the invention.

In addition, the shape of the cross section of the supporting element 74 is not particularly restricted. As shown in FIG. 13, the shape of the cross section of the supporting element 74d is a solid circular. As shown in FIG. 14, the shape of the cross section of the supporting element 74f is an "I" profile. As shown in FIG. 15, the shape of the cross section of the supporting element 74g is a "U" profile. As shown in FIG. 16, the cross sections of the supporting elements 74h and 74h' are respectively a dual-convex-lens-like profile and a dual-concave-lens-like profile. Of course, the cross sections of the supporting elements may be respectively a single-convex-lens-like profile and a single-concave-lens-like profile depending on the actual demands. As shown in FIG. 17, the two supporting elements 74i and 74i' have the cross sections of the hollow circular profile and the hollow rectangular profile.

Because the supporting element 74 has the elasticity and can replace a part of the sidewall of the body 71, the material for forming the sidewall of the body 71 may be reduced. When the fan module 7 is assembled on the system frame 6, each supporting element 74 is in contact with the system frame 6 to provide a sufficient supporting force. Thus, the material for forming the fan module of the invention may be greatly reduced, and the cost may be greatly reduced.

As shown in FIG. 18, a fan module 8 according to a third embodiment of the invention is almost the same as those of the above-mentioned embodiments, wherein only a body 81, connecting elements 82 and supporting elements 83 of the fan module are illustrated in the drawing. The difference between this embodiment and the first and second embodiments is that each supporting element 83 and each, connecting element 82 are disposed on the top surface 811 of the body 81, and the accommodating space 812 of the body 81 is concave and formed from the top surface 811 of the body 81.

Compared FIG. 3 to FIG. 18, the accommodating space 513 is located at a side of the body 51 opposite to the system frame 4 when the fan module 5 of the first embodiment is assembled on the system frame 4. In the current third embodiment, the accommodating space 812 of the third embodiment is located at a side of the body 81 facing the system frame when the fan module 8 is assembled on a system frame (not shown).

Consequently, the invention does not intend to limit the location of the accommodating space and allows various variations according to the actual condition, the air flowing direction of the fan assembly (e.g., forward or backward direction), or the type of the fan assembly (e.g., the axial-flow fan or the vortex fan).

Besides, the invention also discloses a fan casing including a body, at least two supporting elements and at least two connecting elements. In this case, the body, the supporting elements and the connecting elements are the same as those disclosed in the previous embodiments, so the detailed descriptions are omitted.

In summary, the fan module and its fan casing of the invention have two connecting elements or two supporting elements. Compared to the prior art, the fan module may be firmly mounted on the system frame after each connecting element is inserted into and connected with the hole of the system frame. Thus, the installation is time-saving and convenient, and the cost may be reduced. In this structure, each supporting element may be still in contact with the system frame to provide a sufficient supporting force even if the material for constructing the body is reduced. Thus, the invention indeed has a better product utility.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A fan module adapted to be assembled on a system frame, the fan module comprising:
   a body having an accommodating space;
   a fan assembly disposed in the accommodating space of the body; and
   at least two connecting elements protruding from the body, wherein the connecting elements are inserted into and connected with a corresponding hole of the system frame,
   wherein the hole has a large-radius portion, a small-radius portion and a neck portion between the large-radius portion and the small-radius portion, a maximum inner diameter of the large-radius portion is greater than a maximum inner diameter of the small-radius portion, and the maximum inner diameter of the small-radius portion is greater than an inner diameter of the neck portion.

2. The fan module according to claim 1, wherein one end of each of the connecting elements is formed with at least one hook portion, and the hook portion respectively pass through the hole to combine with the system frame.

3. The fan module according to claim 1, wherein a maximum inner diameter of the small-radius portion ranges between a minimum inner diameter of the connecting element after the connecting element is compressed and a maximum inner diameter of the connecting element before the connecting element is compressed; or the maximum inner diameter of the small-radius portion ranges between a minimum inner diameter of the connecting element after the connecting element is compressed and a minimum inner diameter of the connecting element before the connecting element is compressed.

4. The fan module according to claim 1, wherein the hole has a circular shape, an elliptic shape, a polygonal shape or a butterfly shape.

5. The fan module according to claim 1, further comprising:
   at least two supporting elements disposed on an outer periphery of the body.

6. The fan module according to claim 5, wherein at least one end or a middle portion of each of the supporting elements is in contact with the system frame or connected to the outer periphery of the body.

7. The fan module according to claim 6, wherein the middle portion has at least one protrusion.

8. The fan module according to claim 5, wherein a cross section of each of the supporting elements is shaped as a solid circle, a hollow circle, an ellipse, a polygon, an I profile, an U profile, a convex-lens-like profile or a concave-lens-like profile.

9. The fan module according to claim 5, wherein the supporting elements and the body are integrally formed.

10. The fan module according to claim 5, wherein each of the supporting elements is a rib, an arc rib, a helical structure, a spring or an elastomer.

11. The fan module according to claim 1, wherein the fan assembly comprises a stator structure and a rotor structure coupled to the stator structure.

12. The fan module according to claim 1, wherein the connecting elements are integrally formed as a single piece with the body.

13. A fan module adapted to be assembled on a system frame, the fan module comprising:
   a body having an accommodating space;
   a fan assembly disposed in the accommodating space of the body; and
   at least two supporting elements disposed on an outer periphery of the body,
   wherein at least one portion away an end of each of the supporting elements is in contact with the system frame or connected to the outer periphery of the body.

14. The fan module according to claim 13, wherein the portion away the end of each of the supportin2 elements has at least one protrusion.

15. The fan module according to claim 13, wherein a cross section of each of the supporting elements is shaped as a solid circle, a hollow circle, an ellipse, a polygon, an I profile, an U profile, a convex-lens-like profile or a concave-lens-like profile.

16. The fan module according to claim 13, wherein the supporting elements and the body are integrally formed.

* * * * *